(12) United States Patent
Arrowsmith

(10) Patent No.: US 6,183,840 B1
(45) Date of Patent: Feb. 6, 2001

(54) EDGE PROTECTOR STRIP

(75) Inventor: Edward Morris Arrowsmith, Mordialloc (AU)

(73) Assignee: Nylex Corporation Limited (AU)

( * ) Notice: Under 35 U.S.C. 154(b), the term of this patent shall be extended for 0 days.

(21) Appl. No.: 09/077,638

(22) PCT Filed: Dec. 3, 1996

(86) PCT No.: PCT/AU96/00777

§ 371 Date: Sep. 8, 1998

§ 102(e) Date: Sep. 8, 1998

(87) PCT Pub. No.: WO97/20750

PCT Pub. Date: Jun. 12, 1997

(30) Foreign Application Priority Data

Dec. 4, 1995 (AU) .................................................. PN6964

(51) Int. Cl.⁷ .............................. B65D 85/66; B32B 3/24
(52) U.S. Cl. ........................... 428/131; 428/81; 428/121; 428/122; 264/145; 264/153; 264/155; 264/156; 206/397; 206/398; 206/400; 206/453; 206/586
(58) Field of Search ............................. 428/131, 81, 121, 428/122; 206/397, 398, 400, 453, 586; 264/145, 153, 155, 156

(56) References Cited

U.S. PATENT DOCUMENTS

| | | | |
|---|---|---|---|
| 3,434,435 | 3/1969 | Achermann et al. | 108/56 |
| 3,955,677 | 5/1976 | Collingwood | 206/453 |
| 4,516,892 | 5/1985 | Curro, Jr. | 410/155 |
| 4,666,748 | * 5/1987 | Rinkewich | 428/12 |
| 4,793,485 | 12/1988 | Bertolotti | 206/397 |
| 4,858,762 | 8/1989 | Kewin | 206/414 |
| 4,928,454 | 5/1990 | Bertolotti | 53/409 |

FOREIGN PATENT DOCUMENTS

| | | |
|---|---|---|
| 51.663/64 | 5/1967 | (AU) . |
| 62175/73 | 8/1975 | (AU) . |
| 1 37.532/78 | 1/1980 | (AU) . |
| 68543/94 | 12/1994 | (AU) . |
| 69743/94 | 12/1994 | (AU) . |
| 2147277 | 5/1973 | (DE) . |
| 0150097 A1 | 7/1985 | (EP) . |
| 2 084 705 | 12/1971 | (FR) . |
| 2541932-A1 | 9/1984 | (FR) . |
| 2 611 664 | 9/1988 | (FR) . |
| WO 93/09931 | 5/1993 | (WO) . |

* cited by examiner

Primary Examiner—William P. Watkins, III
(74) Attorney, Agent, or Firm—Wolf, Greenfield & Sacks, P.C.

(57) ABSTRACT

An extruded plastic strip (1) adapted for use in protecting the edge of an article having a curved surface: said strip including alongitudinal groove (6), a flexible covering portion (2) extending from one side of the longitudinal groove adapted to be placed over and conform with the curve surface of an article to be protected and a plurality of tabs (3–5) hinged to and extending from the other side of the longitudinal groove, wherein said covering portion includes a plurality of holes (9, 10) which are located at or proximate the outer most edge of the covering portion.

30 Claims, 2 Drawing Sheets

EDGE PROTECTOR STRIP

FIELD OF INVENTION

This invention relates to a plastics packaging strip intended for use in protecting the edges of articles and in particular articles with curved surfaces.

SUMMARY OF THE INVENTION

The present invention has particular application for use in protecting the edges of rolls of metal sheet but it should be appreciated that the invention has application for use with other articles especially where such articles have-ourved outer or inner surfaces. The invention will hereafter be described with reference to its use in protecting the edges of a roll of sheet metal but it will be appreciated that the invention is not so limited.

Rolls of sheet metal are notoriously difficult to transport from their place of manufacture to the end user. They are large, heavy and have exposed edges. When transported, it is generally necessary to secure the rolls to the tray of a semi trailer or the like using chains which are passed through the centre of the roll and secured to the tray. The exposed edges of the rolls of steel sheet have in the past been the subject of significant damage and a number of different alternative methods have been proposed for better protecting the rolls of sheet metal and these have included both metal and plastic edge strips.

One particular solution previously proposed has been the use of a flexible plastic edge strip having a series of tabs integrally attached and hinged to a covering portion generally of uniform width. A groove provided in the plastic strip at the junction between the tabs and the covering portion of the strip has provided the necessary hinging to enable the tabs to be disposed in a position perpendicular to the covering portion.

When the tabs are disposed in a position perpendicular to the covering portion the plastic strip may be curved around the outer edge of the article to be protected and the perpendicular tabs can move towards each other when the plastic strip is formed into the shape of the roll. An example of such a flexible plastic strip is disclosed in Australian patent specification 653,868.

It is preferred when making a plastic edge strip of the kind shown in Australian patent specification 653,868 that the strip be formed from an extruded plastics material. Most preferably, the strips are manufactured from an extruded plastics sheet in which two or more edge strips are formed from a single extruded sheet. In this method of manufacture a number of grooves are formed longitudinally along the sheet. The sheet is then cut into a number of strips so to provide a plurality of edge strips from the one extruded sheet and adjacent each of the grooves respective tab formations are formed, usually by a punching operation.

Whilst this method of production facilitates manufacture of multiple strips from one sheet of material, it has been found that the product once cut into strips may not always retain the desired profile. It is not entirely clear why this happens but the applicant believes that the thermoplastic material from which the packaging strips are formed retain stresses inherent in an extrusion process and that after cutting and subsequent cooling of the product, these stresses are to some extent released resulting in a bowing. This bowing or warping normally manifests itself by the product bowing inwardly along the tab edge and bowing outwardly along the non tab or covering portion edge. This unexpected bowing of the product impinges on its utility for use along a straight edge of a curved product such as the straight edge of a roll of sheet metal.

Surprisingly, it has been discovered that the propensity of the packaging strip to warp or bow after it has been separated into a unitary structure is reduced if the non tab side of the packaging strip is perforated so to include a plurality of holes, especially if such holes are located proximate to the edge of the packaging strip on the opposite side to that including the tabs.

Thus, in accordance with a first aspect of the present invention there is provided an extruded plastics strip adapted for use in protecting the edge of an article having a curved surface; said strip including a longitudinal groove, a flexible covering portion extending from one side of the longitudinal groove adapted to be placed over and conform with the curved surface of an article to be protected and a plurality of tabs hinged to and extending from the other side of the longitudinal groove; wherein said covering portion includes a plurality of holes which are located at or proximate the outer most edge of the covering portion.

Preferably the tabs are spaced from each other such that there is a gap between adjacent tabs proximate the groove end of the tabs. Most preferably this gap increases in width between the respective adjacent tabs as they extend away from the groove.

The holes in the covering portion are believed to balance (at least in part) the effect of the cut out portions between the tabs on the manner in which the strip responds when cooling and to reduce the extent to which the extruded plastics strip will bow or warp.

The holes formed at or proximate the edge of the covering portion of the packaging strip can extend so to include part of the edge of the strip (in which case the edge will have a number of cut away sections) but preferably they are close to but do not extend all the way to the edge of the covering portion. The holes may be of any shape but they are preferably circular. This shape is believed to be the optimum shape for stress relief within the plastic material.

The holes are preferably located so that the ratio of the distance from the edge of the covering portion to the closest edge of the holes: the width of the covering portion from its edge to the longitudinal groove is 0.15 or less. Most preferably it is 0.10 or less.

Where the intended purpose of the packaging strip is to protect the edges of rolls of metal sheet it is preferred that the packaging strip include a covering portion between 75–100 mm wide and that the closest edges of at least some of the holes to the edge of the covering portion be no more than 15 mm from the edge of the covering portion. In a particularly preferred embodiment for use in protecting rolls of metal sheet the covering portion is approximately 90 mm wide and the closest edges of at least some of the holes are no more than 10 mm from the edge of the covering portion.

In a further embodiment of the invention the covering portion includes holes of at least two different sizes with the smaller holes being closer to the edge of the covering portion. In this manner, larger holes can be provided in a central portion of the covering strip so to minimize material use and the smaller holes can be located proximate the edge of the covering portion (to reap the benefits of the invention) but spaced sufficiently apart to maintain adequate stiffness along the edge.

Thus, in accordance with this aspect of the invention there is provided an extruded plastics strip adapted for use in protecting the edge of an article having a curved surface;

said strip including a longitudinal groove, a flexible covering portion extending from one side of the longitudinal groove adapted to be placed over and conform with the curved surface of an article to be protected, and a plurality of tabs hinged to and extending from the other side of the longitudinal groove; wherein said covering portion includes holes of at least two different sizes.

Preferably the smaller holes are located closer to the edge of the covering portion than are the larger holes. Most desirably the covering portion of the packaging strip includes a first row of smaller holes which are located closest to the edge of the covering portion and a second set of larger holes located in the central section of the covering portion. Most preferably the second set of larger holes is formed from two rows of circular apertures arranged in a chequer board type pattern in which the holes in one row are offset from the holes in the second row. Preferably, the smaller holes are located proximate to the edge of the covering portion at proportionate distances in the range referred to above with respect to the first aspect of the invention.

The tabs which extend from the longitudinal groove are preferably spaced apart. Preferably the tabs each have an outer edge which is shorter than the opposite end which is attached to the longitudinal groove. Most preferably, there is a cut away V section between each of the tabs which extends into the longitudinal groove. In one embodiment of the invention, the tabs are also provided with a plurality of holes. It is not considered that the size or location of the holes in the tabs is as important in achieving the anti warping properties of the packaging strip as are those holes located in the covering portion.

In the embodiment of the invention described above in which each of the tab portions are spaced from each other by a cut away V portion or section, it is preferred that the covering portion of the packaging strip not include any hole in its surface close to or proximate the end of this V cut away portion. It is believed that the removal of the material between the tabs which yields the cut away V portion contributes substantially to the propensity of the packaging strip to bow. Removal of further material close to this section of the strip is expected to exacerbate the bowing problem and hence it is preferable that no additional material be removed from the packaging strip close to this area.

In accordance with a further aspect of the present invention, there is provided a method of simultaneously manufacturing two or more packaging strips the said method including the following steps:

(i) extruding a plastics material and forming it into a substantially flat sheet of uniform thickness;

(ii) forming a plurality of longitudinal grooves in said sheet;

(iii) removing a number of separate and spaced areas of material from the sheet at locations extending from one side of each of the longitudinal grooves in which each of the removed areas has an outer edge parallel with but spaced from the respective groove which is wider than an inner edge of the removed area adjacent said groove;

(iv) forming a number of separate and spaced holes in the sheet at positions located on the opposite side of each of the longitudinal grooves;

(v) cutting the sheet into a plurality of separate strips in which each strip comprises one longitudinal groove and first and second straight edges which are parallel with each other and the longitudinal groove;

wherein the first longitudinal edge of each strip is located in line with the outer edges of the removed areas so to form a plurality of tabs which extend from the respective grooves and wherein the spaced holes formed in the opposite side of each of the longitudinal grooves are positioned so to be between the longitudinal groove and the second longitudinal edge of each strip.

Most preferably, the holes are formed in the sheet and the material is removed so to form the tabs in a single punching operation conducted after the longitudinal grooves have been formed in the sheet. The forming cutting and punching operations are preferably conducted whilst the material is above 25° C. Most preferably, when the material being used is high density polyethylene the forming punching and cutting operations are conducted whilst the temperature of the material is between 25° C. to 35° C. Most preferably, these operations are conducted before the temperature of the material cools below 30° C. Each of the separate strips are thereafter coiled and allowed to cool.

Surprisingly, it has been discovered that the incorporation of the separate and spaced holes between the longitudinal groove and the second longitudinal edge of each strip minimises the extent to which the strips warp or curve as they cool.

Preferably the spaced holes are positioned so to be proximate the location of the second longitudinal edge of each strip.

The strips can be formed so that there is no waste material between respective strips and thus when the sheet is cut at a particular location to form the first longitudinal edge of one strip, the same cut produces the second longitudinal edge of the adjacent strip.

The longitudinal grooves may be formed in the sheet using methods known in the art. For example, they may be formed using a process similar to that described in Australian patent specification 653,868 in which a forming wheel impresses the material shortly after the sheet has been extruded. Alternatively, and preferably, the grooves are formed by routing tools so to cut out in each case a longitudinal groove having a semi circular cross section.

Most preferably, the spaced holes formed on the opposite side of the longitudinal groove are positioned and located in the areas previously described and in the configuration described for the covering portion of the packaging strip so formed.

In addition, it is preferred that the area of the sheet intended to form the tabs extending from the longitudinal grooves also include a plurality of holes.

Preferably the plastics material used in the formation of the extruded strips is a thermoplastic material such as polypropylene or high density polyethylene.

The applicants have found that the order in which some of the respective steps are conducted is not critical to the invention. Thus, it has been found that the sheet may be cut into a plurality of separate strips before each of the respective strips are punched so to include the holes and to form the tabs provided that these steps are conducted before the separate strips have cooled to room temperature. Thus, in accordance with another embodiment of the present invention there is provided a method of simultaneously manufacturing two or more packaging strips, the said method including the following steps:

(i) extruding a plastics material and forming it into a substantially flat sheet of uniform thickness;

(ii) forming a plurality of longitudinal grooves in said sheet;

(iii) cutting the sheet into a plurality of separate strips in which each strip comprises one longitudinal groove and first and second straight edges which are parallel with each other and the longitudinal groove;

(iv) removing a number of separate and spaced areas of material from each strip at locations extending from one side of the longitudinal groove of each respective strip so to form a plurality of tabs which extend from the groove of each of the strips;

(v) forming a number of separate and spaced holes in each of the respective strips at positions located on the opposite side of each of the longitudinal grooves to that from which the tabs extend;

wherein the spaced holes are formed in the portion on the opposite side of the longitudinal groove in each of the respective strips.

Most preferably in this embodiment of the invention, the holes are formed in the sheet and the material is removed so to form the tabs in a single punching operation conducted shortly after the sheet has been cut into the separate strips. The forming, cutting and punching operations are most preferably conducted whilst the material is above 25° C. As indicated for the previous embodiment, where the material is high density polyethylene, it is preferred that these operations be conducted whilst the temperature of the material is between 25° C. to 35° C.

The holes are preferably spaced and positioned in the portion on the other side of the longitudinal groove to the tabs in similar fashion to that as previously described.

It will be apparent to those skilled in the art that it is not necessary to form the tabs by the removal of the spaced areas of material either before or after the removal of the material to form the spaced holes on the opposite side of the longitudinal groove in each of the respective strips. Most preferably, the holes are formed and the tabs created by the removal of the necessary material in a single punching operation.

BRIEF DESCRIPTION OF THE DRAWINGS

The invention is hereinafter described with reference to a preferred embodiment in which.

DETAILED DESCRIPTION

Figure 1:
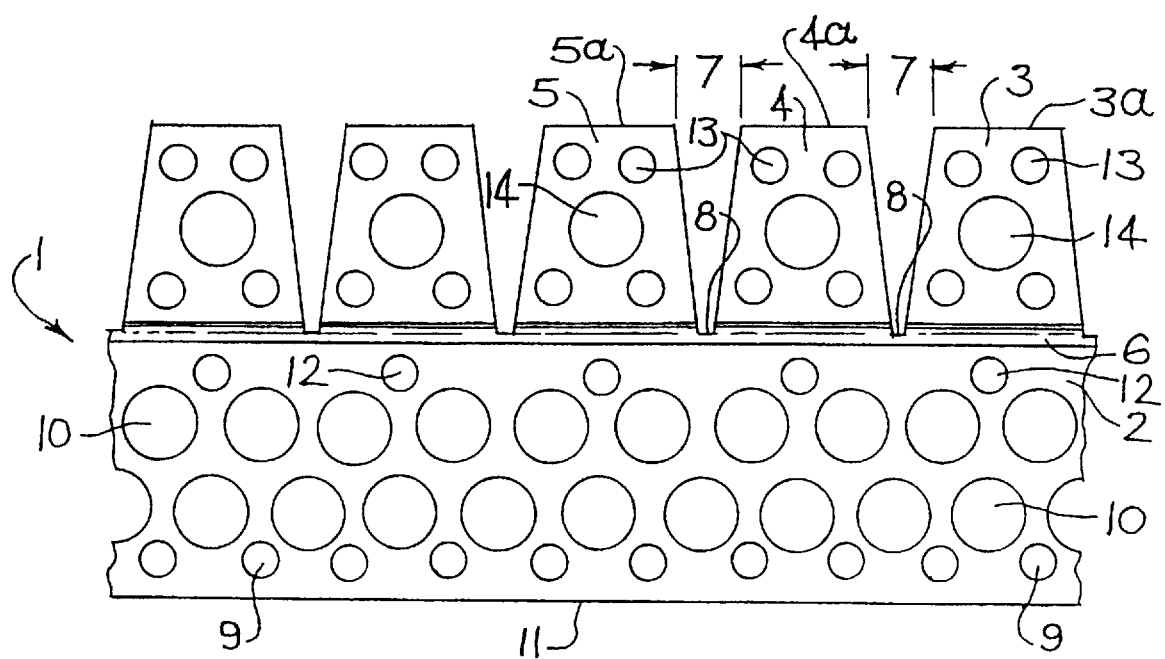
FIG. 1 is an illustration of a packaging strip made in accordance with the invention.

With reference to FIG. 1, there is illustrated a packaging strip 1 which is formed from an extruded plastics material. The packaging strip 1 includes a flexible covering portion 2 and a plurality of tabs including 3, 4, 5. Tabs 3, 4, 5 extend from the edge of a longitudinal groove 6 about which said tabs may be hinged so to move into a position perpendicular to covering portion 2. The tabs are spaced from each other at their outer edges 3a, 4a and 5a by a distance shown between the arrows marked 7. The distance between the respective tabs reduces towards the longitudinal groove but the tabs are still spaced and separate from each other at the junction 8 with the longitudinal groove.

The covering portion includes a plurality of holes which are offset with respect to each other. The holes are of two different sizes such as the holes designated 9 and 10. The larger holes designated 10 are located in the central portion of the covering portion 2 and are primarily incorporated so to light weight the packaging strip and to reduce the amount of material used in its production. The smaller holes 9 are located proximate to the edge 11 of packaging strip 1. A further series of holes designated 12 are located on the other side of the covering portion which are aligned with the centres of the respective tabs 3, 4 and 5. It will be noted that no material is removed from the covering portion in that area proximate to the bottom of the cut out portion near the area designated 8. Preferably no hole is present within 15 mm of the junction of the cut away portion 24 and the longitudinal groove. This is to avoid an exacerbation of the unbalanced stresses within the extruded sheet. Tabs 3, 4 and 5 also include a series of holes 13 and 14 of different sizes.

Figure 2:
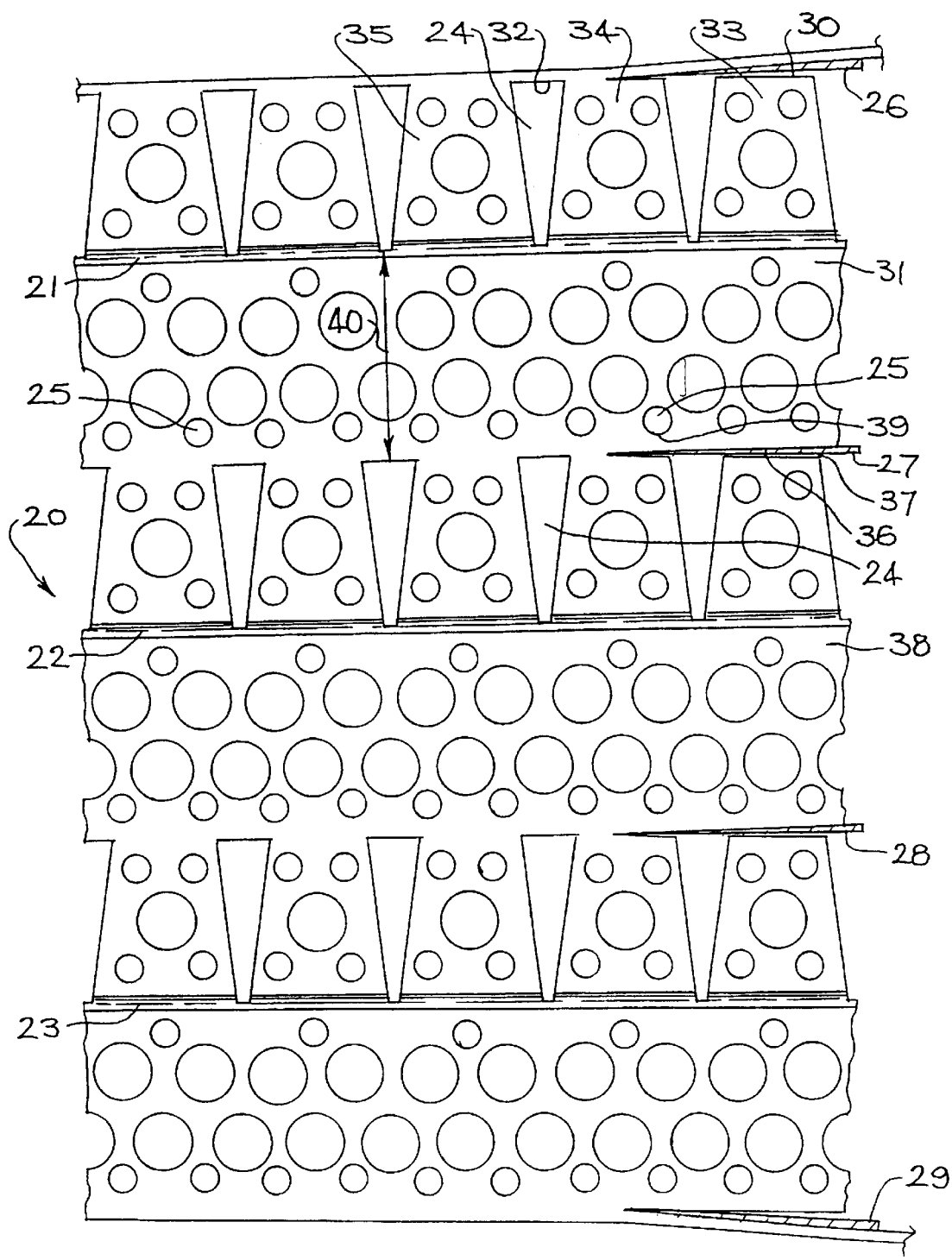
FIG. 2 is a representation of part of an extruded sheet in which the sheet has been punched with holes and is being cut into three separate packaging strips.

With reference to FIG. 2, there is illustrated an extruded plastics material which has been formed into a substantially flat sheet 20. Sheet 20 is of such width to simultaneously form three separate packaging strips. It will be appreciated that the invention is not limited to an embodiment such as this and indeed preferably the sheet is of such width that five strips can be simultaneously formed. Reference to three strips as shown in FIG. 2 has been used to simplify the present description. The sheet 20 has formed therein three separate longitudinal grooves 21, 22 and 23. From this sheet there is removed a number of separate and spaced areas such as those shown at 24. In the representation shown in FIG. 2, these removed areas appear above each of the respective longitudinal grooves. A number of separate and spaced holes 25 are formed in the sheet at positions located on the opposite side of the respective longitudinal grooves.

As shown in FIG. 2, the sheet is cut in four separate locations 26, 27, 28 and 29. The cut away portions at 26 and 29 are at the edges of the sheet and are necessary as the edge of the sheet is not uniformly straight. These cuts produce straight sides on the packaging strips being formed. It will be apparent from FIG. 2 that the first longitudinal edge 30 of strip 31 is formed by cutting in line with the outer edge 32 of the removed area 24 so to form a plurality of tabs 33, 34, 35. The cut at location 27 results in the formation of the second longitudinal edge 36 of strip 1 and the first longitudinal edge 37 of strip 38. The spaced holes 25 are positioned so to be proximate the second longitudinal edge of each strip such as edge 36 of strip 31. Preferably, holes 25 are located so that the ratio of the distance from the second longitudinal edge 36 to the closest edge 39 of holes 25: the width 40 of the covering portion is 0.15 or less. Most preferably it is 0.10 or less. In a particularly preferred embodiment the width 40 of the covering portion is approximately 90 mm and the closest edges 39 of the holes 25 are no more than 10 mm from second longitudinal edge 36.

In the method of the present invention the sheet 20 shown in FIG. 2 is formed using standard extrusion techniques so to form a substantially flat sheet. Longitudinal grooves 21 are formed within the sheet using known techniques as hereinbefore described. Preferably they are formed by a routing procedure. The material removed to form the tabs such as removed material 24 is removed by a standard punching operation whilst the plastics sheet is warm (preferably above 25° C.) and the holes 25 are produced in the same way at the same time. The sheet 20 is separated into separate plastic strips such as in FIG. 2 by cutting blades adapted to cut straight and parallel edges. Once the sheet has been separated into respective packaging strips these are then coiled and cooled.

Alternatively, as hereinbefore described, it is possible to separate sheet 20 into separate plastic strips by cutting blades adapted to cut straight and parallel edges before the material is subjected to any punching operation. Once the sheet has been separated into the respective packaging strips, the necessary material may be removed to form tabs such as the removed material 24 by a standard punching operation whilst the plastic sheet is warm (again, preferably above 25° C.) and the holes 25 may be produced in the same way at the same time. If this method is adopted, the strips are then coiled and ready for wrapping immediately following the punching operations.

Various modifications and improvements may be made to the packaging strip and the method for producing same as hereinbefore described without departing from the spirit or ambit of the present invention as defined in the following claims. In particular, it will be noted that there are a large number of different configurations and placements for the holes in either the tabs or covering portions of the packaging strips.

What is claimed is:

1. An extruded plastics strip adapted for use in protecting the edge of an article having a curved surface, said strip including a longitudinal groove, a flexible covering portion which extends from one side of the longitudinal groove and which is adapted to be placed over and conform with the curved surface of an article to be protected and a plurality of tabs hinged to and extending from the other side of the longitudinal groove; wherein said covering portion includes an outer most edge which is spaced from the longitudinal groove and wherein a plurality of holes are located at or proximate said outer most edge of the covering portion.

2. An extruded plastics strip as claimed in claim 1 wherein the tabs are spaced from each other such that there is a gap between adjacent tabs proximate the groove end of the tabs.

3. An extruded plastics strip as claimed in claim 1 wherein the tabs are spaced from each other such that there is a gap between adjacent tabs and such gap increases in width between the respective adjacent tabs as they extend away from the longitudinal groove.

4. An extruded plastics strip as claimed in claim 1 wherein the said holes in the covering portion are located so that they are close to but do not extend all the way to the outer most edge of the covering portion.

5. An extruded plastics strip as claimed in claim 1 wherein at least some of the holes in the covering portion are located so that the ratio of the distance from the outer most edge of the covering portion to the closest edge of the holes: the width of the covering portion from its edge to the longitudinal groove is 0.15 or less.

6. An extruded plastics strip as claimed in claim 5 wherein the said ratio is 0.10 or less.

7. An extruded plastics strip as claimed in claim 1 wherein the said holes are circular.

8. An extruded plastics strip as claimed in claim 1 wherein the covering portion is between 75 to 100 mm wide and wherein the closest edges of at least some of the holes to the outer most edge of the covering portion are no more than 15 mm from the edge of the covering portion.

9. An extruded plastics strip as claimed in claim 8 wherein said covering portion is approximately 90 mm wide and the closest edges of at least some of the holes are no more than 10 mm from the outer most edge of the covering portion.

10. An extruded plastics strip adapted for use in protecting the edge of an article having a curved surface; said strip including a longitudinal groove; a flexible covering portion which extends from one side of the longitudinal groove and which is adapted to be placed over and conform with the curved surface of an article to be protected, and a plurality of tabs hinged to and extending from the other side of the longitudinal groove; wherein said covering portion includes an outer most edge which is spaced from the longitudinal groove and wherein holes of at least two different sizes are located at or proximate said outer most edge of the covering portion.

11. An extruded plastics strip as claimed in claim 10 wherein the smaller holes are located closer to the outer most edge of the covering portion than are the larger holes.

12. An extruded plastics strip as claimed in claim 10 wherein the covering portion of the plastics strip includes a first row of small holes which are located closest to the outer most edge of the covering portion and a second set of larger holes are located in the central section of the covering portion.

13. An extruded plastics strip as claimed in claim 10 wherein at least some of the smaller holes are located proximate to the outer most edge of the covering portion.

14. An extruded plastics strip as claimed in claim 13 wherein the smaller holes located proximate to the edge of the covering portion are positioned such that the ratio of the distance from the edge of the covering portion to the closest edge of the holes: the width of the covering portion from its outer most edge to the longitudinal groove is 0.15 or less.

15. An extruded plastics strip as claimed in claim 13 wherein the covering portion is between 75 to 100 mm wide and the closest edges of at least some of the smaller holes to the outer most edge of the covering portion are no more than 15 mm from the outer most edge of the covering portion.

16. An extruded plastics strip as claimed in claim 13 wherein said covering portion is approximately 90 mm wide and the closest edges of at least some of the smaller holes are no more than 10 mm from the outer most edge of the covering portion.

17. An extruded plastics strip as claimed in claim 10 wherein the tabs also include a plurality of holes.

18. An extruded plastics strip as claimed in claim 10 wherein there is a cut away section between each of the tabs which extends into the longitudinal groove.

19. An extruded plastics strip as claimed in claim 18 wherein the covering portion does not include any hole in its surface close to or proximate to the end of the cut away portion between the tabs.

20. An extruded plastics strip as claimed in claim 19 wherein the covering portion does not include any hole in its surface within 15 mm of the junction of the cut away portion and the longitudinal groove.

21. A method of simultaneously manufacturing two or more packaging strips, the method including the following steps:
   (i) extruding a plastics material and forming it into a substantially flat sheet of uniform thickness;
   (ii) forming a plurality of longitudinal grooves in said sheet;
   (iii) removing a number of separate and spaced areas of material from the sheet at locations extending from one side of each of the longitudinal grooves in which each of the removed areas has an outer edge parallel with but spaced from the respective groove which is wider than an inner edge of the removed area adjacent said groove;
   (iv) forming a number of separate and spaced holes in the sheet at positions located on the opposite side of each of the longitudinal grooves;
   (v) cutting the sheet into a plurality of separate strips in which each strip comprises one longitudinal groove and first and second straight edges which are parallel with each other and the longitudinal groove;
      wherein the first longitudinal edge of each strip is located in line with the outer edges of the removed areas so to form a plurality of tabs which extend from the respective grooves and wherein the spaced holes formed in the opposite side of each of the longitudinal grooves are positioned so to be between the longitudinal groove and the second longitudinal edge of each strip and wherein a plurality of said holes are located at or proximate said second longitudinal edge of each strip.

22. A method as claimed in claim 21 wherein a single punching operation is conducted after the longitudinal grooves have been formed in the sheet so to form the holes in the sheet and so to remove the material to form the tabs.

23. A method as claimed in claim 21 wherein the holes are formed in the sheet whilst the material is above 25° C.

24. A method as claimed in claim 23 wherein the plastics material is high density polyethylene and the holes are formed in the sheet whilst the temperature of the material is between 25° C. to 35° C.

25. A method as claimed in claim 24 wherein said holes are formed in the sheet whilst the temperature of the material is between 25 to 30° C.

26. A method as claimed in claim 21 wherein the area of the sheet intended to form the tabs extending from the longitudinal grooves also includes a plurality of holes.

27. A method of simultaneously manufacturing two or more packaging strips, the method including the following steps:
 (i) extruding a plastics material and forming it into a substantially flat sheet of uniform thickness;
 (ii) forming a plurality of longitudinal grooves in said sheet;
 (iii) cutting the sheet into a plurality of separate strips in which each strip comprises one longitudinal groove and first and second straight edges which are parallel with each other and the longitudinal groove;
 (iv) removing a number of separate and spaced areas of material from each strip at locations extending from one side of the longitudinal groove of each respective strip so to form a plurality of tabs which extend from the groove of each of the strips;
 (v) forming a number of separate and spaced holes in each of the respective strips at positions located on the opposite side of each of the longitudinal grooves to that from which the tabs extend;
   wherein the spaced holes are formed in the portion on the opposite side of the longitudinal groove in each of the respective steps and wherein a plurality of said holes are located at or proximate the outer most edge of said portion on the opposite side of the longitudinal groove.

28. A method as claimed in claim 27 wherein the holes are formed in the sheet and the material is removed so to form the tabs in a single punching operation conducted after the sheet has been cut into separate strips.

29. A method as claimed in claim 21 wherein the holes are formed in the sheet whilst the material is above 25° C.

30. A method as claimed in claim 29 wherein the plastics material is high density polyethylene and the holes are formed in the sheet whilst the temperature of the material is between 25° C. to 35° C.

* * * * *